J. B. NEIL.
COTTON PICKER.
APPLICATION FILED DEC. 23, 1915.

1,252,016.

Patented Jan. 1, 1918.
6 SHEETS—SHEET 1.

Witnesses
J. P. Tomen
R. L. Parker.

J. B. Neil    Inventor,
by C. A. Snow & Co.
Attorneys

J. B. NEIL.
COTTON PICKER.
APPLICATION FILED DEC. 23, 1915.

1,252,016.

Patented Jan. 1, 1918.
6 SHEETS—SHEET 2.

Witnesses

J. B. Neil
Inventor, by C. A. Snow & Co.
Attorneys.

J. B. NEIL.
COTTON PICKER.
APPLICATION FILED DEC. 23, 1915.

1,252,016.

Patented Jan. 1, 1918.
6 SHEETS—SHEET 3.

Fig. 3.

Witnesses

Inventor,
J. B. Neil
by C. A. Snow & Co.
Attorneys.

J. B. NEIL.
COTTON PICKER.
APPLICATION FILED DEC. 23, 1915.

1,252,016.

Patented Jan. 1, 1918.
6 SHEETS—SHEET 5.

Witnesses

J. B. Neil
Inventor,
by C. A. Snow & Co.
Attorneys.

UNITED STATES PATENT OFFICE.

JOSEPH B. NEIL, OF FILBERT, SOUTH CAROLINA.

COTTON-PICKER.

1,252,016.  Specification of Letters Patent.  Patented Jan. 1, 1918.

Application filed December 23, 1915. Serial No. 68,392.

*To all whom it may concern:*

Be it known that I, JOSEPH B. NEIL, a citizen of the United States, residing at Filbert, in the county of York and State of South Carolina, have invented a new and useful Cotton-Picker, of which the following is a specification.

This invention relates to machines for picking cotton, the same being of that type utilizing a picking roll, a spiral roll, and a doffing means such as shown, for example, in the patent granted to me April 17, 1917, and bearing the Patent No. 1,223,328.

One of the objects of the present invention is to simplify and otherwise improve upon the structure of machines of this type whereby the same is rendered more efficient in operation, easier to handle, and less likely to get out of order than heretofore.

A further object is to provide a cotton picking machine utilizing picking units such as disclosed in my patent before mentioned, each unit, however, having means whereby an up and down motion is imparted thereto during the operation thereof so that there is little possibility of any portion of the cotton plant failing to come into contact with the picking roll of at least one of the units of the machine, thus insuring the thorough picking of the plants engaged by the machine.

A further object is to provide a machine of this character having housings for the picking units whereby it becomes impossible for any of the cotton bolls to work into the machine back of the picking rolls but, instead, all cotton bolls are deflected to points where they will be properly engaged by the picking rolls.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—

Referring to the figures by characters of reference A and B designate the sides of the main frame of the machine, each side including a bottom strip 1 provided, at its ends, with uprights 2 and 3 respectively on which is secured a top strip 4 extending forwardly beyond the upright 2. A cross strip 5 is secured upon the uprights 3 so as to connect the sides A and B at the rear ends thereof and another cross strip 6 is secured to the upper end of the uprights 2 and connects the sides A and B. Diagonally disposed braces 7 may be employed between the forwardly projecting portion of the top strips 4 and the cross strip 6 as shown particularly in Fig. 2, thus to brace the main frame transversely and additional braces 8 may be secured to the lower end portions of the uprights 3 and to the cross strip 5, as shown in Fig. 3.

A stub axle 9 is extended laterally from each of the uprights 3 above the lower end thereof and the outer end portion of each stub axle is provided with two braces 10 and 11. Each brace 10 is secured at its upper end to the upper portion of the adjacent upright 3, while each brace 11 is extended forwardly and secured to the forward end portion of the adjacent strip 1.

A supporting wheel 12 is mounted for rotation on each stub axle 9 and each of these wheels has a sprocket 13 adapted to rotate therewith.

Extending forwardly from each of the uprights 2 above the lower end thereof is an arm 14 and the front end of each arm is connected to the front end of the strip 4 thereabove by a front strip 15. Journaled in bearings 16 secured to the front end portions of the strip 4 and arm 14 are stems 17 provided at their lower ends with casters 18. Each stem is mounted to slide as well as rotate in its bearing and secured on each stem and between the bearings is a collar 19 which may be adjusted longitudinally of the stem and held against movement relative thereto by means of a set screw 20 or in any other suitable manner. A coiled spring 21 is mounted on each stem and bears downwardly on the collar 19 and upwardly against the upper bearing 16. These springs 21 constitute cushioning means.

Figure 1:
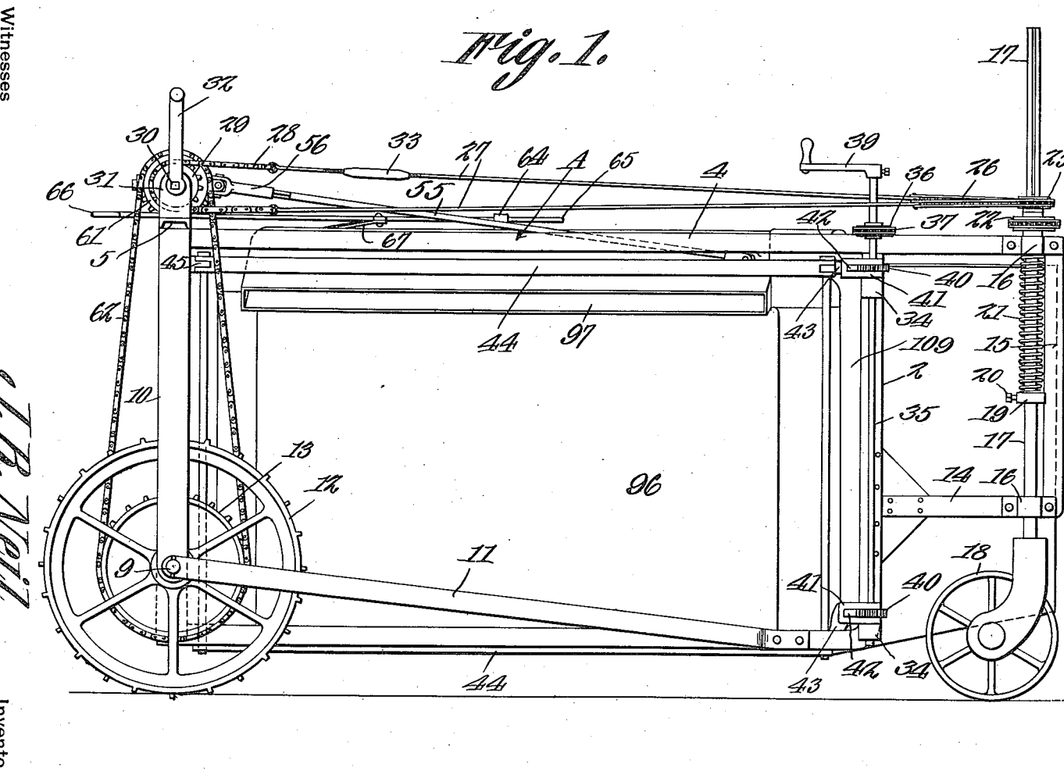
Figure 1 is a side elevation of the machine.
Figure 2:
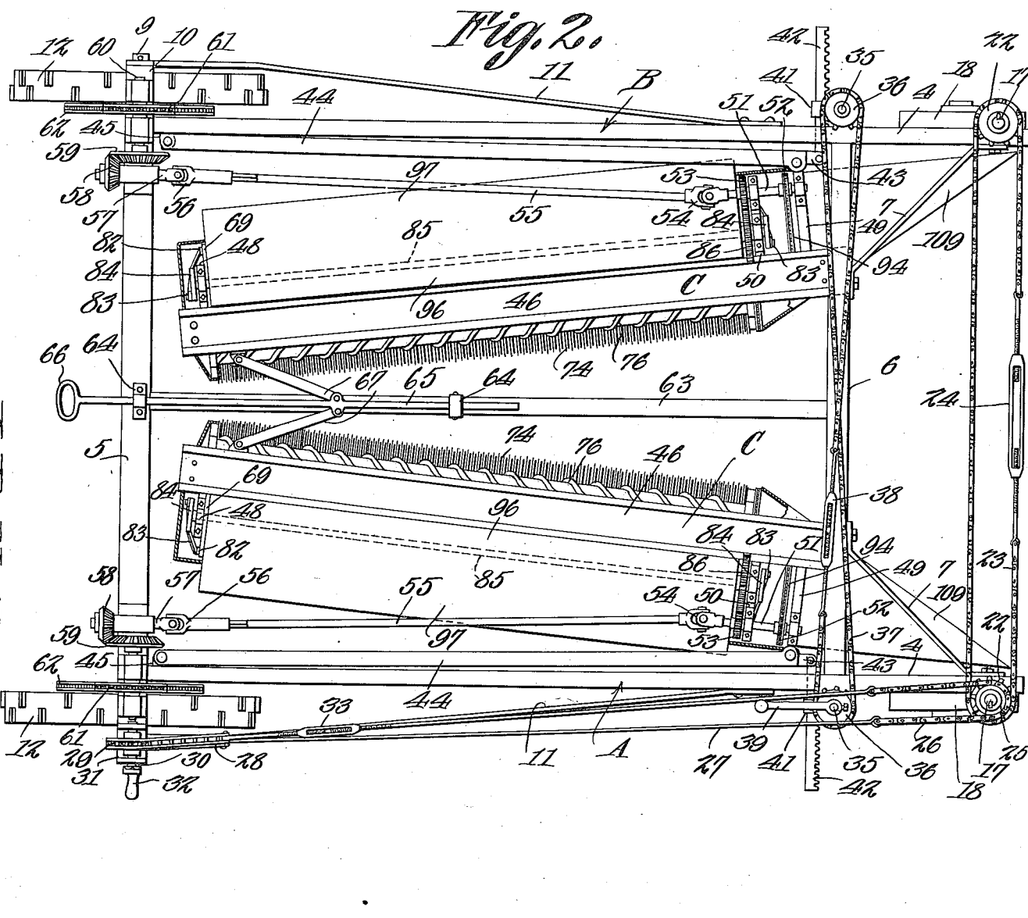
Fig. 2 is a plan view thereof, parts being broken away.
Figure 3:
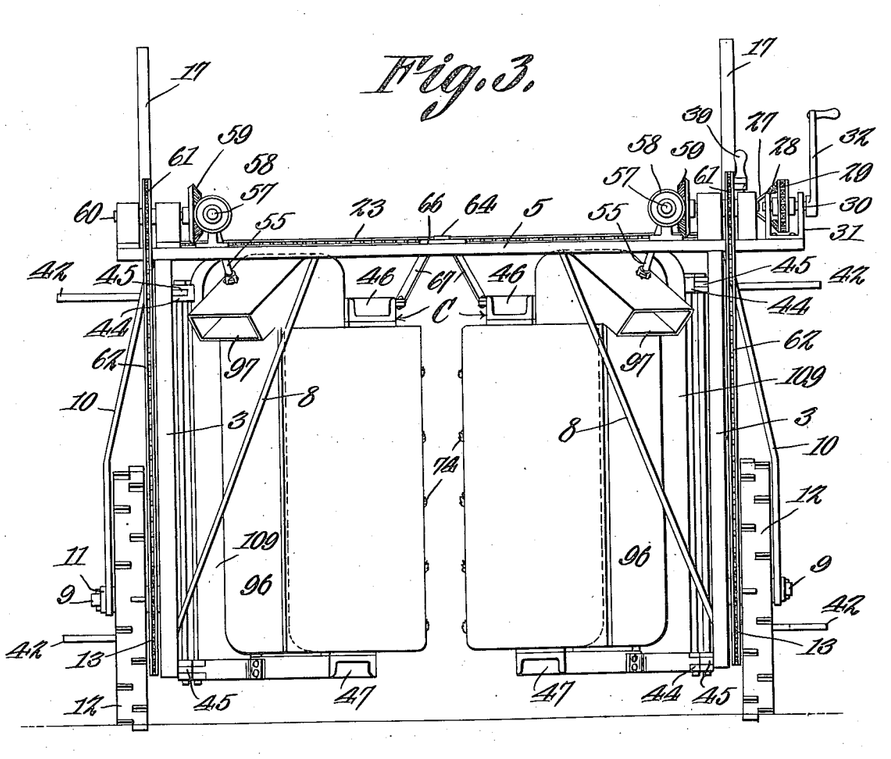
Fig. 3 is a rear elevation of the machine.
Figure 4:
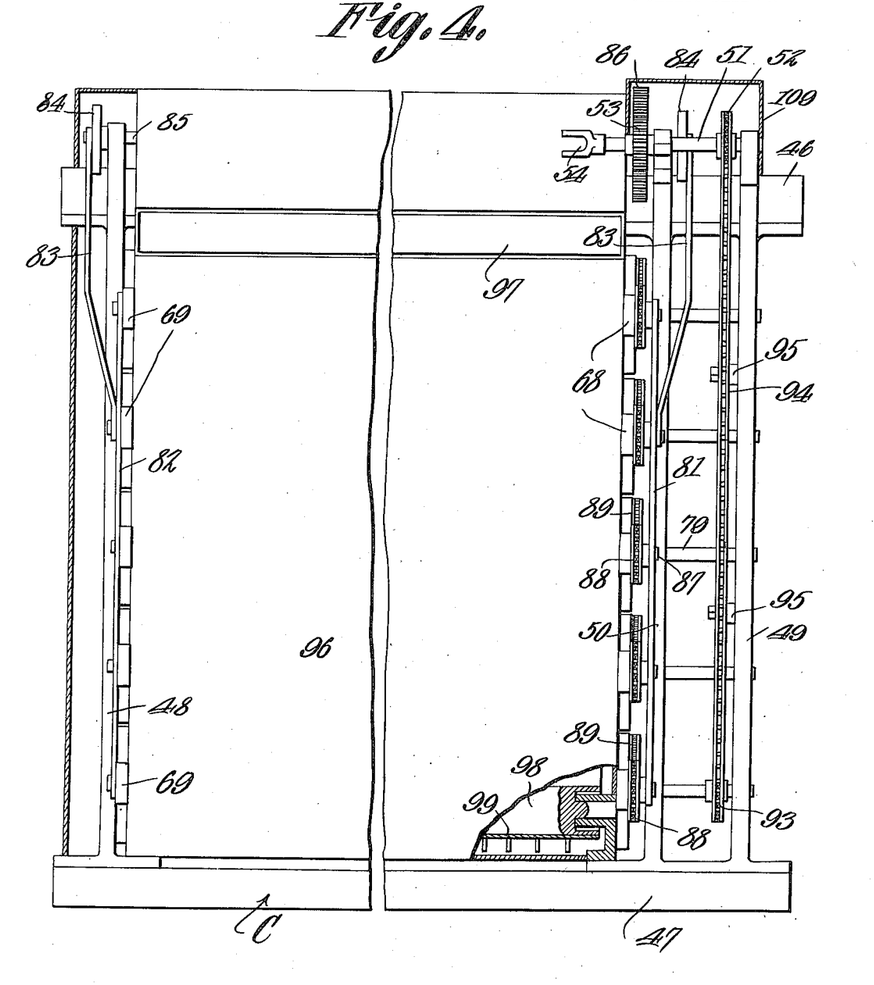
Fig. 4 is an elevation of the outer side of one of the picker frames and the parts carried thereby, certain portions being shown in section.

Feathered on each of the stems 17 and above the strip 4 is a sprocket 22 and the sprockets on the two stems are engaged by a chain 23 the ends of which may be adjustably connected by a turn buckle 24, as shown in Fig. 2. Another sprocket 25 is feathered on one of the stems 17 and this sprocket is engaged by a chain 26 the ends of which are connected by rods 27 to a chain 28 engaging a sprocket 29. This sprocket is secured to a short shaft 30 journaled in a bracket 31 outstanding from the upper end of one of the uprights 3 and a crank arm 32 or the like is employed whereby said shaft 30 and sprocket 29 may be rotated thus to transmit motion through the chains 28 and 26 and the rods 27 to the sprocket 25 and, in turn, to the two stems 17 so that the entire machine can thus be steered readily. As shown particularly in Figs. 1 and 2, one of the connections between the two chains 26 and 28 can be provided with a turn buckle 33, thus to take up slack in the chains.

Arranged upon the upper and lower portion of each of the uprights 2 is a bearing 34 and journaled in the bearing on each upright is an upwardly extending shaft 35 provided, adjacent its upper end, with a sprocket 36. The sprockets on the two shafts engage a crossed chain 37 or the like the ends of which may be adjustably connected by a turn buckle 38, as shown in Fig. 2. One of the shafts may be provided with a crank arm 39 or any other suitable means whereby it can be rotated readily, the chain 37 constituting means whereby when one of the shafts is rotated in one direction, the other shaft will be rotated in the opposite direction. Mounted on each shaft 35 near the ends of the upright 2 are gears 40 and straddling each gear and pivotally mounted on the shafts 35 is a yoke-like guide 41. The guides engaging each shaft 35 are slidably engaged by rack bars 42 which constantly mesh with the adjacent gears 40 and are pivotally connected at their inner ends to ears 43 extending forwardly from the front end of frames 44 which are pivotally mounted, at their rear ends, upon ears 45 extending inwardly from the rear portions of the sides A and B of the main frame. Thus it will be seen that when the two shafts 35 are rotated simultaneously in opposite directions the rack bars 42 will be actuated so as to swing the front ends of the frames 44 toward or from each other as desired.

Hingedly connected to the front end portion of each frame 44 is a picker frame C preferably made of upper and lower channel strips 46 and 47, a back strip 48 fastened at its ends thereto, and parallel front members 49 and 50. The members 48, 49 and 50 extend laterally beyond the top and bottom strips 46 and 47, the outer sides of the end members 49 being the parts of the frames C which are attached to the front ends of the frames 44, as will be seen by referring particularly to Fig. 2.

As shown in Fig. 2, the end members 49 and 50 extend upwardly against and beyond the top strip 46 to provide bearings for a shaft 51 to which is secured a sprocket 52 and a gear 53. Shaft 51 is connected by a universal joint 54 to a telescopic shaft section 55 the other end of which is connected by a universal joint 56 to a short shaft section 57 journaled on the cross strip 5 near one end thereof. A gear 58 is secured to the shaft section 57 and constantly meshes with a gear 59 secured to a short shaft 60. A sprocket 61 is secured to the shaft 60 and receives motion, through a chain 62, from the adjacent sprocket 13. Thus it will be seen that when the machine is moved forward, motion will be transmitted from each wheel 12 to the sprocket 52 and gear 53 carried by the adjacent picker frame C, irrespective of the bodily or the angular adjustment of said picker frame relative to the main frame.

The lateral adjustment of the front end of the picker frame C relative to the main frame is effected by the racks 42 and the parts coöperating therewith as hereinbefore pointed out, it being apparent that when the front end of each frame 44 is swung laterally in either direction, a corresponding movement of the front end of the picker frame C will likewise be effected. The rear end of each picker frame may be shifted laterally in either direction about the hinged connection between the frames C and 44 by means of a toggle arrangement illustrated particularly in Fig. 2. By referring to said figure it will be seen that a longitudinal beam 63 connects the middle portions of the cross strips 5 and 6 and mounted on this beam and on the cross strip 5 are guides 64 slidably engaged by a rod 65 which may be provided at its rear end with a handle 66. Links 67 are pivotally connected to the rod 65 and to the rear end portions of the respective frames C. Thus it will be apparent that by pulling rearwardly on the rod 65, the rear end portions of the frames C will be moved from each other whereas, by pushing forwardly on the rod 65, the rear end portions of the two frames C will be swung toward each other.

Figure 7:
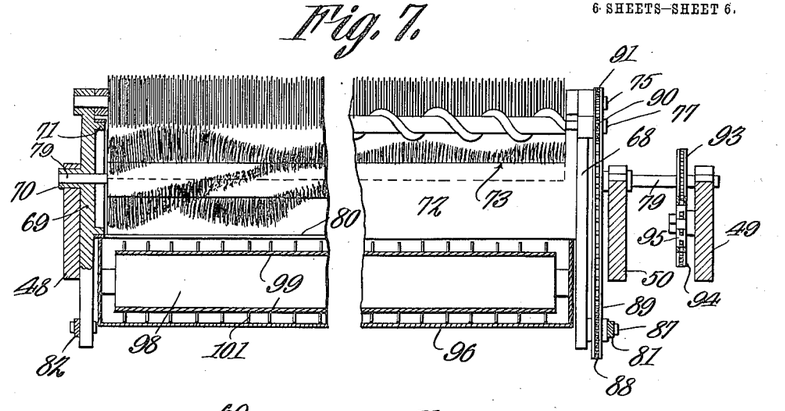
Fig. 7 is a horizontal section through one of the picker frames and parts carried thereby and showing portions of a picking unit.
Figure 8:
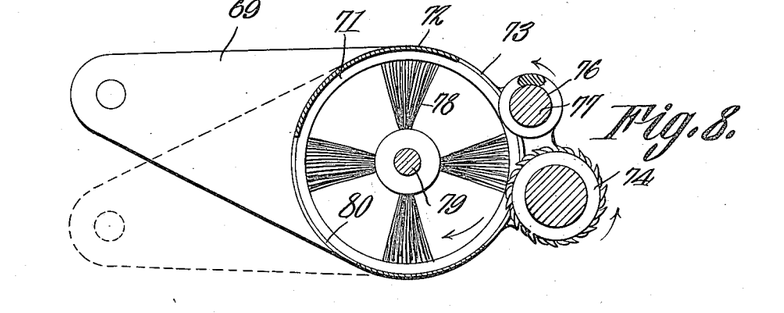
Fig. 8 is an enlarged vertical section through one of the picking units.

Each of the picking frames C carries a series of parallel superposed picking units. Each unit comprises a pair of rock arms 68 and 69 each having a boss 70 extending outwardly therefrom and pivotally mounted in the adjacent member 50 or 48. The arm 68 is located back of the member 50, while the arm 69 bears against the front face of the member 48, as shown especially in Fig. 7. Each of the arms is provided upon the inner side thereof and concentric with the boss 70, with a circular rib 71 and fitted tightly upon these ribs so as to surround them are the end portions of a tubular housing 72. A slot 73 is formed in the outer portion of each housing and is of sufficient width to receive a portion of a picker roll 74 the shaft 75 of which is journaled in the outer or front ends of the arms 68 and 69, and to receive a portion of a spiral roll 76 the shaft 77 of which is journaled upon the arms 68 and 69 near the front or outer ends thereof. This spiral roll is located above and close to the picker roll, as in the machine disclosed in my patent hereinbefore referred to and the picker roll and the spiral roll both extend practically throughout the length of the picking unit, the ends of the rolls being disposed close to the ribs 71. Obviously the slot 73 is of sufficient length to receive the rolls 74 and 76 and, as shown in Fig. 8, the said slot extends a short distance above and below the rolls. A brush 78 is arranged within the tubular housing 72, its shaft 79 being journaled within the bosses 70.

An outlet slot 80 is formed in the housing 72 and extends through approximately 90 degrees, this slot being of practically the same length as the brush 78 and the rolls 74 and 76, the lower wall of the slot 80 being located a short distance inwardly from the vertical center of the housing 72.

Figure 6:
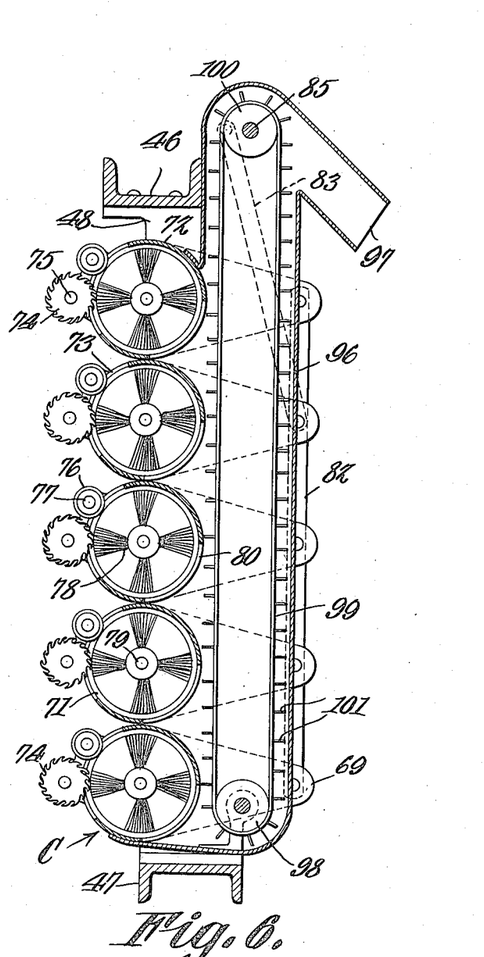
Fig. 6 is a vertical transverse section through one of the picker frames and the picking units carried thereby.

The various picking units are so positioned that the top portion of each housing 72 nearly touches the lower portion of the next adjoining housing 72 so that it is thus impossible for any cotton bolls to pass between the superposed housings. In this connection see Fig. 6 of the drawings.

The inner ends of all of the arms 68 on one frame C are pivotally connected to a bar 81 and another like bar 82 is pivotally connected to the inner ends of all of the arms 69 carried by the frame C. A pitman 83 is connected to each bar 81 and 82, these pitmen being connected to disks 84 secured to the front and rear end portions of a shaft 85 journaled on the members 50 and 48. A gear 86 is secured to the shaft 85 and constantly meshes with the gear 53 so that during the rotation of shaft 51, an up and down swinging movement of the units carried by frame C is effected.

Figure 5:
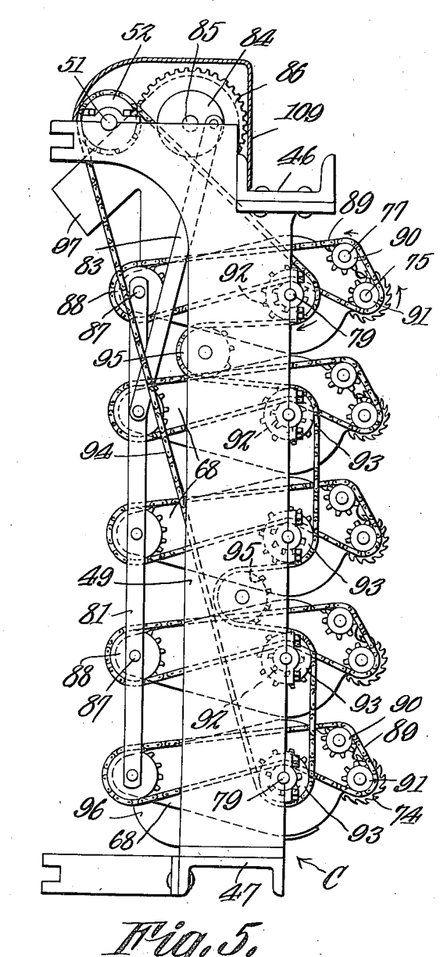
Fig. 5 is an end elevation of one of the picker frames, and the parts carried thereby, the hood on the top thereof being shown in section.

The studs 87 constituting the pivotal connections between the bars 81 and the arms 68 also serve as bearings for idler sprockets 88. Each of these idler sprockets 88 is engaged by an endless chain 89 passing over and in engagement with a sprocket 90 secured to the shaft 77 of the unit and then under and in engagement with a sprocket 91 secured to the shaft 75 of said unit. The chain then passes over a sprocket 92 secured to the shaft 79 of said unit and back to the sprocket 88. Thus it will be seen that all of the shafts 75, 77 and 79 of each unit will rotate simultaneously but in different directions, the direction of rotation being indicated by the arrows in Figs. 5 and 8.

Each shaft 79 is not only journaled in the members 48 and 50, but also in the front member 49 and journaled to each shaft 79 and between the members 49 and 50 is a sprocket 93. An endless chain 94 is engaged by and receives motion from the sprocket 52 and extends downwardly under the lowermost sprocket 93, thence upwardly over the next adjoining sprocket 93, then partly around an idler sprocket 95 which is arranged between the members 49 and 50, then back into engagement with the next sprocket 93, thence over the next sprocket 93 thereabove, thence back into engagement with a second idler sprocket 95, then into engagement with the uppermost sprocket 93 and back to the sprocket 52. Thus it will be seen that during the rotation of the shaft 51, all of the sprockets 93 will be simultaneously rotated in the same direction and, consequently the parts of each unit will be simultaneously operated as hereinbefore described.

Each of the tubular housings 72 hereinbefore referred to opens, through its outlet slot 80, into a vertical housing 96 arranged between the outwardly projecting end portions of the arms 68 and 69 and secured in any desired manner to the frame C. Each housing 96 is provided, at its upper end, with an outwardly and downwardly inclined spout 97 extending throughout the length of the housing and, consequently, throughout the length of the picking units. Journaled in the lower portion of each housing 96 is a roll 98 engaged by a belt 99 which extends up to the top portion of the housing 96 where it is mounted on a roll 100. This belt constitutes an elevator and can, if desired, be provided with outwardly projecting teeth 101. The upper roll 100 is secured to and rotates with the shaft 85 to which the disks 84 are secured. Thus it will be seen that any cotton directed outwardly into the housing 96 from a picking unit will be engaged by the elevating belt and carried upwardly over roll 100 and slipped into the outlet spout 97 which is adapted to discharge the cotton into a sack, not shown, and which is so shaped and proportioned as to extend around the spout 97 and, consequently, throughout the length of the picking units.

It is not deemed necessary to go into a detailed description of the operation of the picking and doffing elements of each unit as the same operate in the same manner as disclosed in the Patent 1,223,328. It need only be stated that as the machine is moved forward, motion will be transmitted to the parts of each picking element so that each picking roll will engage the cotton fiber while the stems of the plant are being held in upstanding positions by the spirals 76. The cotton fiber when pulled from the hulls will be doffed from the picking rolls by the rapidly rotating brushes and directed outwardly through the openings or slots 80 and against the elevators 100.

Figure 9:
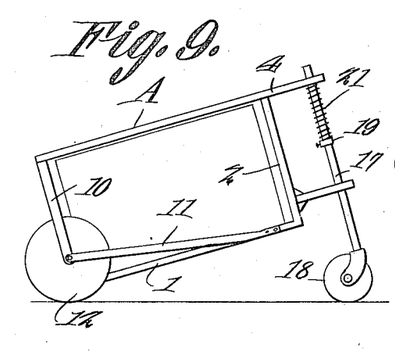
Fig. 9 is a side elevation showing, diagrammatically, the position of the machine relative to the surface of the ground during the picking operation.

In using the machine the same is tilted as shown in Fig. 9, this being done by adjusting the collars 19 upwardly on the stems 17. Thus the picking units are inclined relative to the ground. By means of the links 67 and the parts connected thereto and by means of the racks 42 and the parts cooperating therewith, the rear ends of the picking frames C can be adjusted to any desired distance apart and the front ends of said picking frames can also be adjusted toward or from each other. As the machine moves forwardly it will straddle a row of plants, the plants entering between the opposed series of picking units and the cotton bolls being passed diagonally across the active faces of said units. During this movement, should any of the bolls become lodged between the housings 72 of two of the units, they cannot enter between said housings and pass back of the brushes but, instead, will be deflected outwardly by the housings so as to be engaged positively by the adjacent picking rolls. Furthermore, as the picking units swing upwardly and downwardly during their forward movement, it will be apparent that the up and down wiping action of the picking rolls upon the sides of the plants will result in all of the bolls being engaged thereby and, consequently, little of the fiber contained in the opened or ripened bolls will be missed.

Figure 10:
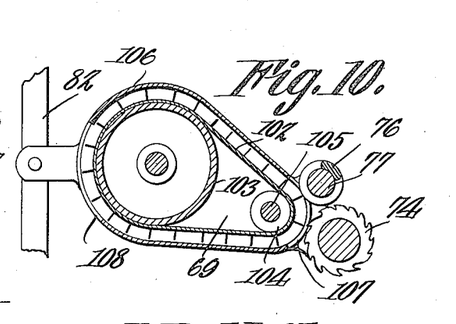
Fig. 10 is a view similar to Fig. 8 and showing a modified form of picking unit.

As shown in Fig. 10, instead of providing a doffing brush in connection with each picking unit, an endless doffing and conveying belt 102 may be used, this belt being mounted on a drum or roll 103 carried between the outer end portions of the arms 68 and 69 and receiving its motion from a roll 104 mounted on a shaft 105 corresponding with the shaft 79. In this modified form of device a housing 106 is extended around the combined doffing and conveying belt and has an opening 107 for receiving cotton fiber from the picking roll 74 and another opening 108 through which the fiber is discharged to the elevator 99.

The particular form of picking roll used in connection with this machine has not been shown or described in detail, inasmuch as the same constitutes the subject matter of a separate application.

It is to be understood that the front end of each of the frames C may be provided with a housing 109 which also constitutes a deflector whereby plants are gathered into the space between the picking frames C. The gearing carried by the members 49 and 50 is arranged within the housing as shown especially in Fig. 2.

What is claimed is:—

1. A cotton picker including a horizontally extending picking unit, a pivotal support for said unit, and means for imparting an up and down reciprocation to said unit.

2. A cotton picker including a rearwardly extending picking unit, a pivotal support for said unit, a conveyer extending below and adapted to receive material from the picking unit, and means for imparting an up and down movement to the picking unit relative to the conveyer.

3. A cotton picker including a substantially horizontal picking unit, a pivotal support for said unit, and means for swinging said unit upwardly and downwardly in an arc.

4. A cotton picker including a substantially horizontal picking unit, a pivotal support for said unit, and means for imparting an up and down movement to said unit, said unit including a picking roll and means for continuously operating the roll during said up and down movement of the unit.

5. A cotton picker including a picking unit and means for imparting an up and down movement to said unit, said unit including a picking element, a spiral roll, and means for continuously operating the spiral roll during said up and down movement of the unit.

6. A cotton picker including a picking unit and means for imparting an up and down movement to said unit, said unit including a picking element, a doffing element, and means for continuously operating the picking and doffing elements during said up and down movement of the unit.

7. A cotton picker including a picking unit and means for imparting an up and down movement to said unit, said unit including a revoluble picking roll, a spiral roll, a doffing element, and means for continuously operating said rolls and doffing element during said up and down movement of the unit.

8. A cotton picker including superposed picking units, each including a housing having a rounded exterior, said housings extending close together and constituting deflectors, and means for simultaneously swinging the units about individual parallel axes.

9. A cotton picker including superposed picking units, each including a housing having a rounded exterior, said housings extending close together and constituting deflectors, and means for simultaneously swinging the units about individual parallel axes, each unit also including a picking roll outside of and projecting into the housing, and a doffing means within the housing.

10. A cotton picker including a picking unit, means for tilting the same about a substantially horizontal axis, means for bodily adjusting said unit laterally, and means for adjusting the unit angularly about an upwardly extending axis.

11. In a cotton picker, a unit comprising opposed rock arms, a housing constituting a connection therebetween, said housing having an inlet, means for rocking the arms and an outlet, a picking roll extending through the inlet and journaled within the rock arms, a spiral roll journaled within the arms and extending into the inlet, and a doffing element mounted for rotation in the housing.

12. In a cotton picker, a unit comprising opposed rock arms, a housing constituting a connection therebetween, said housing having an inlet and an outlet, a picking roll extending through the inlet and journaled within the rock arms, a spiral roll journaled within the arms and extending into the inlet, a doffing element mounted for rotation in the housing, and means for rocking the arms about the axis of the doffing element.

13. In a cotton picker, a unit comprising opposed rock arms, a housing constituting a connection therebetween, said housing having an inlet and an outlet, a picking roll extending through the inlet and journaled within the rock arms, a spiral roll journaled within the arms and extending into the inlet, a doffing element mounted for rotation in the housing, and means for swinging the picking roll upwardly and downwardly about the axis of the doffing element.

14. In a cotton picker, a unit comprising opposed rock arms, a housing constituting a connection therebetween, said housing having an inlet and an outlet, a picking roll extending through the inlet and journaled within the rock arms, a spiral roll journaled within the arms and extending into the inlet, a doffing element mounted for rotation in the housing, means for swinging the picking roll upwardly and downwardly about the axis of the doffing element, an elevator, and a housing therefor, said housing of the picking unit discharging into the housing of the elevator.

15. A cotton picker including opposed series of superposed picking units, said series converging toward one end, a revoluble picking element carried by each unit, said element being extended longitudinally of the unit, and means for simultaneously raising and lowering all of the picking units during the operation of said picking elements.

16. A cotton picker including a vertical housing, an elevator disposed vertically within the housing, a horizontally extending picking unit extending transversely of the elevator, and means for swinging the picking unit upwardly and downwardly relative to the elevator.

17. A cotton picker including a vertical housing, an elevator disposed vertically within the housing, a horizontally extending picking unit extending transversely of the elevator, said picking unit including a picking element, and doffing means for removing cotton from the picking element and throwing it against the elevator.

18. A cotton picker including a vertical housing, an elevator disposed vertically within the housing, a horizontally extending picking unit extending transversely of the elevator, said picking unit including a picking element, doffing means for removing cotton from the picking element and throwing it against the elevator, and means for swinging the picking unit upwardly and downwardly relative to the elevator.

In testimony that I claim the foregoing as my own, I have hereto affixed my signature in the presence of two witnesses.

JOSEPH B. NEIL.

Witnesses:
 H. G. Brown,
 Wm. W. Lewis.